Sept. 15, 1931.　　J. W. HANSEN ET AL　　1,823,601
SYNCHRONOUS SELF STARTING MOTOR
Filed May 11, 1929　　2 Sheets-Sheet 1

INVENTOR
JULIUS W. HANSEN.
WILLIAM L. HANSEN.
IRA N. HURST.
BY Toulmin & Toulmin
ATTORNEY Patented Sept. 15, 1931

1,823,601

UNITED STATES PATENT OFFICE

JULIUS W. HANSEN, WILLIAM L. HANSEN, AND IRA N. HURST, OF PRINCETON, INDIANA, ASSIGNORS TO HANSEN MFG. COMPANY, INC., OF PRINCETON, INDIANA, A CORPORATION OF INDIANA

SYNCHRONOUS SELF STARTING MOTOR

Application filed May 11, 1929. Serial No. 362,356.

Our invention relates to synchronous, self-starting motors.

It is the object of our invention to provide a synchronous, self-starting motor, particularly useful in connection with clocks.

In particular it is our object to provide a multipolar motor with a collector ring of our invention to provide for a self-starting motor with a non-continuous rotor having the advantage of geometrical and geographical poles but still having the advantages of a self-starting motor.

It is our further object to provide a motor with a very narrow air gap, thereby producing high efficiency with a motor of minimum size, and it is our object to provide a rotor with a non-continuous periphery having toothed segments on the margin thereof for the purpose of inducing the starting of the motor.

It is our further object to provide such a motor in combination with fields, a portion of which lag behind the other portion.

Referring to the drawings.

Figure 1:
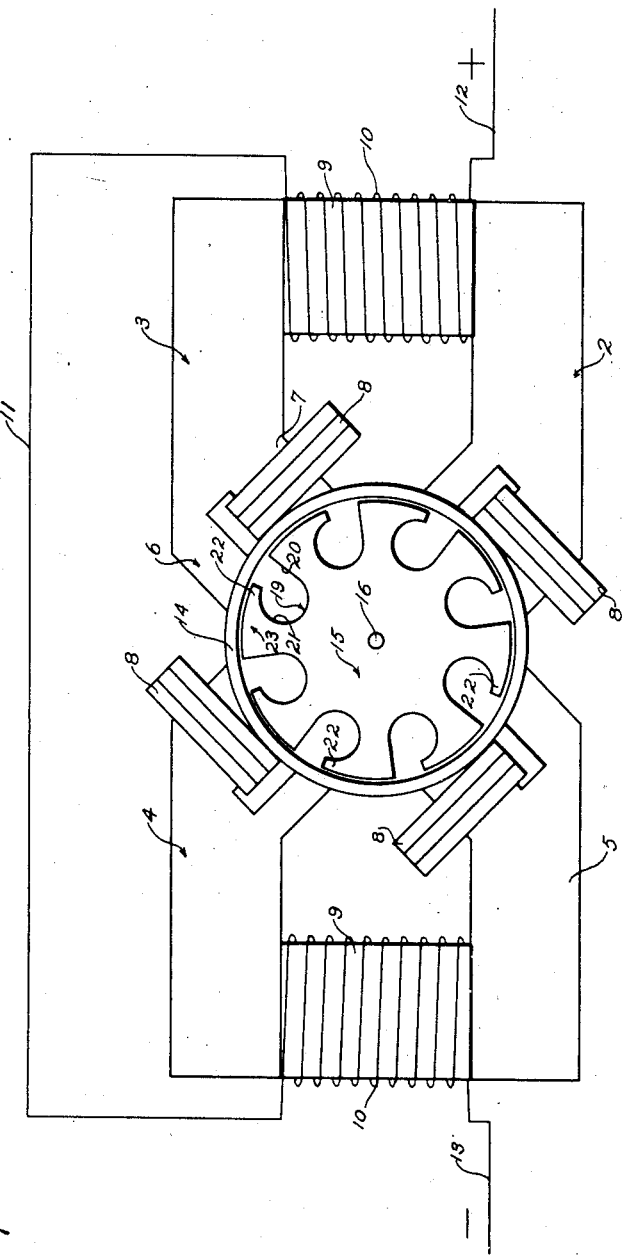
Figure 1 is an electrical diagram of one type of my synchronous motor.
Figure 2:
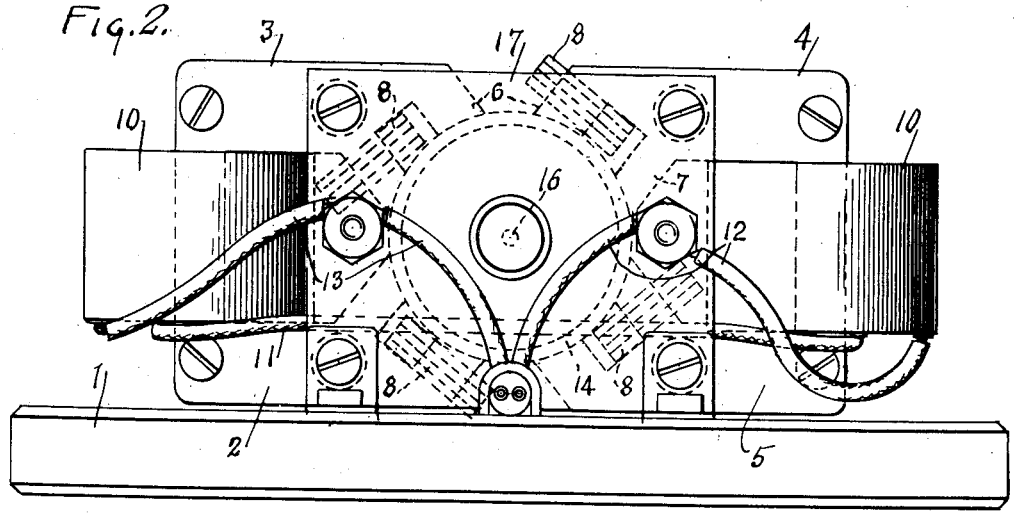
Figure 2 is a rear elevation thereof.
Figure 3:
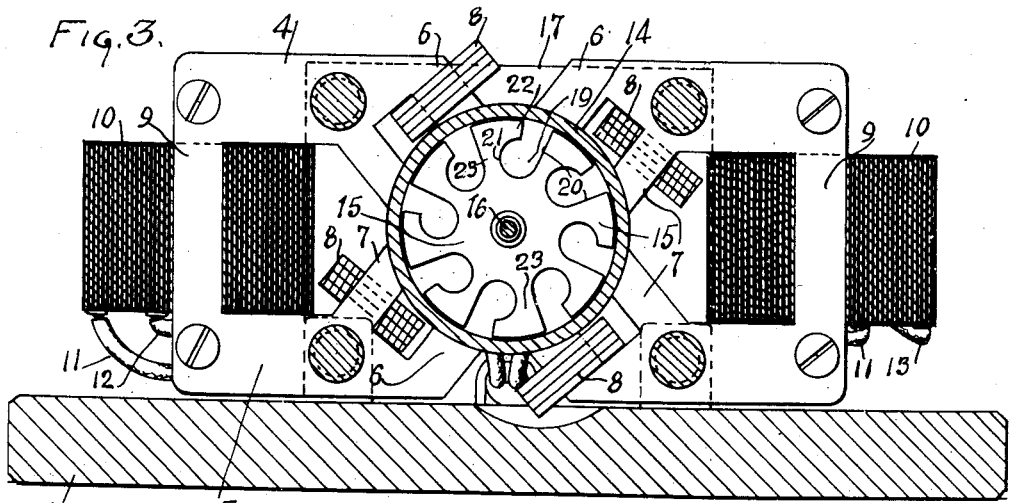
Figure 3 is a longitudinal section thereof.
Figure 4:
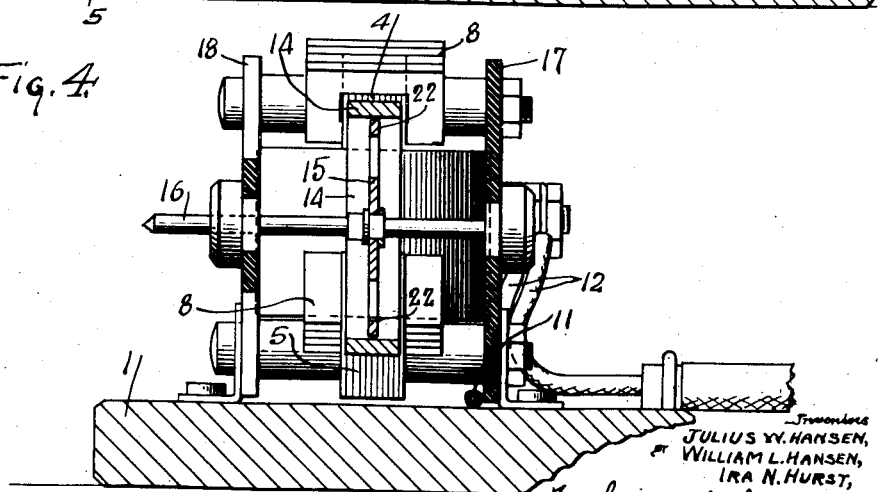
Figure 4 is a cross section thereof.

Referring to the drawings in detail, the motor is mounted upon any base 1, to which are attached arms 2, 3, 4 and 5, each arm having an arcuate pole face and divided into pole portions 6 and 7, the portion 7 having a plurality of shading coils 8.

The arms 2 and 3, and the arms 4 and 5 are joined together by the respective bridge pieces 9 around which are wrapped the field coils 10. These coils are connected together by the wire 11. 12 and 13 indicate the respective connecting wires to the circuit in which the motor is located.

Mounted upon the arcuate ends of the bifurcated pole pieces 6 and 7 is a collector ring 14. Within this ring and closely adjacent to it separated from it by a very narrow air gap is a rotor 15 mounted on the shaft 16 suitably supported in the supporting plate 17 and the spider 18.

This rotor is provided with a plurality of slots 19, each having a straight face 20 and an arcuate face 21 which is the inside of an overhanging hook 22 from the outwardly extending finger piece 23. The essential features of applicants' invention are the ring attached to the poles and the rotor having on the outer periphery thereof slits forming overhanging hooks or horns. In starting applicants' motor the progressive shifting of the poles in the rotor, which is necessary for that purpose, is accomplished by the ring. If the ring were removed and the motor operated without the presence of the ring it would not be broadly self-starting nor would it be a synchronous motor. This has been actually proven by test. This also goes to prove that the starting qualities do not lie in the rotor but that the ring 14 is an essential element in this motor acting as a genuinely self-starting and synchronous motor.

It has also been found by actual practice that if the horns or hooks 22 were removed and the ring retained the motor still would not act as a genuinely self-starting and synchronous motor. It is true that the motor would be self-starting in certain positions, but it would not be self-starting in all positions and for that reason is not a genuinely self-starting motor. It is therefore apparent that the self-starting and the synchronous features of applicants' motor do not lie alone in either one of these features but in the two taken together, the ring being a very essential part of it.

The ring 14 above referred to is to be understood as a magnetic stationary bridging ring, and the term "collector ring," wherever it appears in the specification or claims, is, of course, this magnetic stationary bridging ring, the latter terms being perhaps a little more appropriate form of expression.

Our motor is self-starting and operates synchronously.

It will be understood that we desire to comprehend within our invention and within the scope of our claims such modifications as may be fairly comprehended within such claims and invention due to necessary modifications to adapt our invention to varying conditions of use and to varying purposes.

Having thus fully described our invention, what we claim as new and desire to secure by Letters Patent, is:

1. In combination in a synchronous, self-starting motor, pole pieces, with shading coils, field coils therefor, a collector ring mounted on the faces of said poles, and a disk rotor having fingers forming slots, said fingers having laterally projecting shoulders partially closing said slots revolving within said ring.

2. In combination in a synchronous motor, pole pieces with shading coils, a collector ring mounted on said pole pieces, and a disk rotor having a slotted periphery.

3. In combination in a synchronous motor, pole pieces, a collector ring mounted on said pole pieces, a rotor having a slotted periphery and overhanging portions on the periphery thereof enclosing a portion of said slots.

4. In combination in a synchronous, self-starting motor, a plurality of field poles a collector ring mounted on said pole pieces, and a rotor disk rotatable therein, said disk having fingers on the periphery thereof forming slots, said fingers having laterally projecting shoulders.

5. In combination in a synchronous, self-starting motor, a plurality of field poles with shading coils, field coils and cores associated with pairs of spaced poles, and a rotor disk rotating between said poles having a slotted periphery, said slots being overhung by fingers, the outer surfaces of which are a part of the periphery of the disk, said fingers all projecting in the same direction, and a collector ring interposed between said poles and the periphery of said disk and carried by said poles.

6. In combination in a synchronous, self-starting motor, a plurality of spaced field poles, field coils therefor, said poles having their ends bifurcated, means associated with said bifurcated poles to cause the flux in one portion thereof to lag behind the flux in the other portion, and a rotor disk mounted in cooperative relation with said poles, said disk having fingers forming a slotted periphery, said fingers having shoulders projecting over a portion of said slots adjacent the periphery of the disk.

7. In combination, spaced bifurcated poles, cores joining said poles in pairs, field coils mounted on said cores and connected in series, a collector ring carried by the bifurcated ends of said poles, said bifurcated ends having shading coils one associated with each of said bifurcated ends on each pole and a slotted rotor disk mounted within said collector ring, said slotted disk having laterally-extending projections partially overlapping the slots.

8. A synchronous self-starting motor having, in combination, a stator having means for producing a progressive magnetic field, a stationary bridging ring carried by said stator, and a rotor having a slotted periphery and overhanging portions on the periphery of the rotor partially closing said slots, said rotor revolving within said ring.

9. A synchronous self-starting motor having, in combination, a stator having means for producing a progressive magnetic field, a stationary bridging ring carried by said stator, and a disk rotor having a slotted periphery revolving in said ring.

In testimony whereof, we affix our signatures.

JULIUS W. HANSEN.
WILLIAM L. HANSEN.
IRA N. HURST.